US008005799B2

(12) United States Patent
Goto et al.

(10) Patent No.: US 8,005,799 B2
(45) Date of Patent: Aug. 23, 2011

(54) INFORMATION MANAGEMENT SYSTEM

(75) Inventors: Teruyuki Goto, Kawasaki (JP); Tomoaki Mizoo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 12/489,675

(22) Filed: Jun. 23, 2009

(65) Prior Publication Data
US 2010/0030789 A1 Feb. 4, 2010

(30) Foreign Application Priority Data

Jul. 30, 2008 (JP) ................................. 2008-197068

(51) Int. Cl.
G06F 17/30 (2006.01)
(52) U.S. Cl. ..................................................... 707/674
(58) Field of Classification Search .......................... None
See application file for complete search history.

(56) References Cited

U.S. PATENT DOCUMENTS

| | | | | |
|---|---|---|---|---|
| 5,307,481 A | * | 4/1994 | Shimazaki et al. | 714/11 |
| 5,740,433 A | * | 4/1998 | Carr et al. | 707/610 |
| 6,002,931 A | * | 12/1999 | Yamaguchi et al. | 455/433 |
| 6,065,018 A | * | 5/2000 | Beier et al. | 707/610 |
| 6,493,726 B1 | * | 12/2002 | Ganesh et al. | 1/1 |
| 6,510,421 B1 | * | 1/2003 | Ganesh et al. | 1/1 |
| 2003/0093545 A1 | * | 5/2003 | Liu et al. | 709/231 |
| 2009/0310485 A1 | * | 12/2009 | Averi et al. | 370/232 |

FOREIGN PATENT DOCUMENTS
JP 2904100 B2 6/1999
JP 2001-022627 A 1/2001

* cited by examiner

*Primary Examiner* — Mohammad Ali
*Assistant Examiner* — Syed H Hasan
(74) *Attorney, Agent, or Firm* — Fujitsu Patent Center

(57) ABSTRACT

An active device attaches a sequential number representing a notification number to update record information for recording an event that data is stored, then notifies a preliminary device of the update record information, and, accumulates the update record information. The active device again makes the notification. The preliminary device monitors the update record information of which the active device notifies and detects, based on regularity of the sequential numbers attached to the respective pieces of update record information, missing reception of the update record information. When detecting the missing reception of the update record information, the preliminary device makes a request for retransmitting the update record information and notifies of information about matching data stored in a first storage unit of the active device with data stored in a second storage unit of the preliminary device.

4 Claims, 8 Drawing Sheets

DATA STRUCTURE
| TRANSMISSION INFORMATION |
| SEQUENTIAL NUMBER |
| DATA |
Fig. 4
EXAMPLE OF DATA STORED IN MAIN SYSTEM
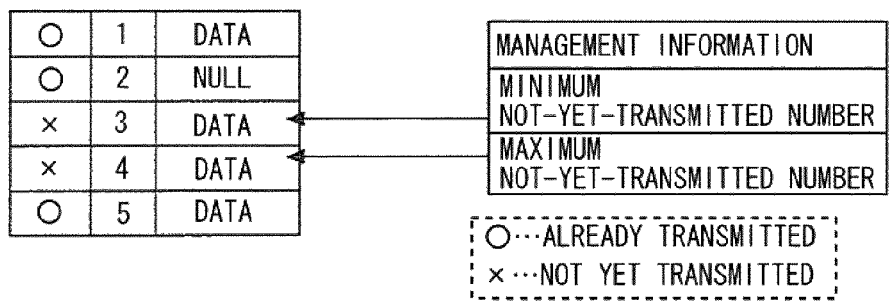
Fig. 5
EXAMPLE OF DATA STORED IN SUBSYSTEM
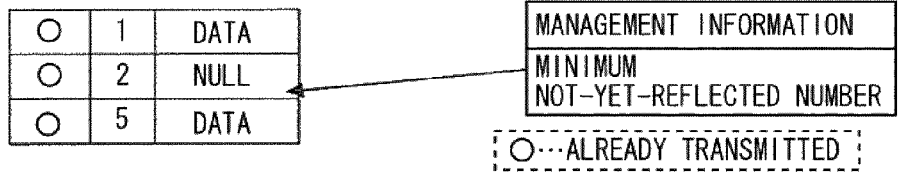
Fig. 6
DATA STORED IN ACCUMULATION LOG
| × | 3 | DATA |
| × | 4 | DATA |
×···NOT YET TRANSMITTED
Fig. 7

INFORMATION MANAGEMENT SYSTEM

This application is based upon and claims the benefit of priority of the prior Japanese Patent Application No. JP2008-197068, filed on Jul. 30, 2008, the entire contents of which are incorporated herein by reference.

FIELD

The present technology relates to management of information in a database etc.

BACKGROUND

The database manages most important pieces of data in an information system of an enterprise. Therefore, even if a part of hardware included in the database gets into a fault, a stable operation at a high level is required of the database. In a database system on which such a critical requirement is imposed, generally server-redundancy based on a cluster configuration has hitherto been implemented. The cluster configuration represents a system for providing services to users by combining a plurality of computers (called nodes). In recent years, however, in this type of system, the following problems have arisen.

Firstly, there might occur a case in which the operation stops due to a fault of a shared component such as a storage.

Secondly, when one of the nodes configuring the cluster is switched over to another node, switching time entails a long period of time, e.g., several tens of seconds through several minutes or longer, depending on a scale.

A most effective measure for coping with the problems given above is a perfect duplex configuration having none of the shared component (such as a shared disk in the conventional cluster configuration). In this case, a quick resumption of the operation is actualized by switching over the node at a high speed in a way that sets a standby node to stand by in a status where a mirroring environment of the database is always started up. This type of perfect duplex system is referred to as simply a duplex system.

The general type of duplex system manages the database in a way that duplexes the database into a main system and a subsystem. The main system and the subsystem exchange the information via a data transfer path. Then, one of the duplexed databases is set as the main system, and only the main system can be updated from an application. With this configuration, consistency between the databases in the duplex system is assured. Moreover, in the duplex system, a server executing the application (which will hereinafter be referred to as an application server) is not aware of the main system and the subsystem. Accordingly, the duplex system provides a function of automatically connecting the main database to the application server.

Moreover, the duplex system accumulates logs in the main system in preparation against a temporary fault on the data transfer path or in preparation for maintaining the subsystem. Then, there is provided a function of automatically restoring the duplex system after being restored from the fault on the data transfer path or after completion of maintaining the subsystem.

Further, the perfect duplex system such as the Duplex System performs, even when the fault occurs in the main-node, switchover to the sub-node, thereby enabling the operation to continue and availability to be improved. The perfect duplex system normally, if the data transfer path becomes abnormal due to abnormality in a network, however, exits the duplexing process because of being impossible of executing the duplexing process. Further, in the case of exiting the duplexing process, the data after exiting the duplexing process is required to be copied to the subsystem from the main system in order to restore again the duplexing process. Therefore, a load on the system when restored rises.

Such being the case, what is demanded as a system is that if there is a possibility of easily obviating the fault such as the abnormality in the network, the logs are accumulated in the main system, and, after obviating the fault, the duplex configuration is restored by automatically retransmitting the logs.

[Patent document 1] Japanese Patent Publication No. 2904100

[Patent document 2] Japanese Patent Application Laid-Open Publication No. 2001-022627

SUMMARY

One mode of the present technology can be exemplified as an information management system including an active device and a preliminary device that are connected to each other via a communication path. Herein, the active device may comprise: a first storage unit stored with data; a notifying unit attaching, when the data is stored in the first storage unit, a sequential number representing a notification number to update record information for recording an event that the data is stored, and notifying the preliminary device of the update record information via the communication path; an accumulating unit accumulating the update record information if unable to confirm completion of the notification, by the notifying unit, of the update record information via the communication path; and a unit notifying again of, when receiving a retransmission request of the update record information from the preliminary device, the update record information accumulated in the accumulating unit through the notifying unit. On the other hand, the preliminary device may comprise: a unit monitoring the update record information of which the active device notifies and detecting, based on regularity of the sequential numbers attached to the respective pieces of update record information, missing reception of the update record information; a second storage unit stored with data; a unit updating the data in the second storage unit according to the update record information of which the active device notifies; a unit making a request for, when detecting the missing reception of the update record information, retransmitting the update record information; and a unit notifying of, based on the sequential number that should be attached to the update record information with the missing of the reception, information about matching data stored in the first storage unit of the active device with data stored in the second storage a unit of the preliminary device.

The object and advantage of the embodiment will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF THE DRAWINGS

FIG. 4 is a diagram illustrating typical components (data elements) of an update log;

FIG. 5 is a diagram illustrating a data structure of data stored in a main system;

FIG. 6 is a diagram illustrating a data structure of data retained by a subsystem;

FIG. 7 is a diagram illustrating a data structure of data stored in an accumulation log;

DETAILED DESCRIPTION

An information management system according to a best mode (which will hereinafter be termed an embodiment) of the present technology will hereinafter be described with reference to the drawings.

A configuration in the following embodiment is an exemplification, and the present technology is not limited to the configuration in the embodiment.

Figure 1:
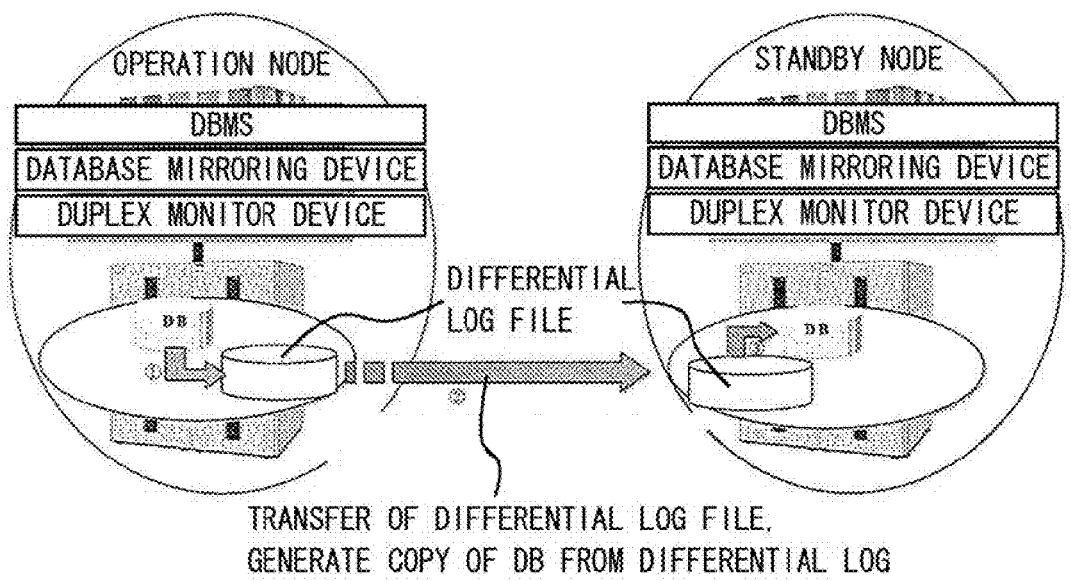
FIG. 1 is a view illustrating a data flow of an information management system.

FIG. 1 illustrates a data flow of the present information management system. The information management system is configured by connecting an operation node and a standby node to each other via a network. The operation node is called a main-system node or an active node, and includes a database management system (DBMS), a database mirroring device, a duplex monitor device, a database and a differential log file. Moreover, the standby node is called a subsystem node or a preliminary device or a preliminary-system node, and includes basically the same configuration as that of the operation node.

The database management system accepts a request from a different device (e.g., an application server etc. which executes an application program) accessing the database, and executes a process for the database. The process is exemplified such as storing the data in the database and reading the data from the database.

Note that the information management system operates in a synchronous transfer mode. The synchronous transfer mode is a mode in which the database is updated in the operation node through a commit operation with respect to the database from the application server etc., and further, after transferring the data to the standby node, completion thereof is reported to the application server etc. Note that in an asynchronous mode, even when the database is updated in the operation node, this does not directly necessarily leads to the assurance that a log is sent to the standby node. Namely, the log is transferred to the standby node at timing that does not separate from the report of the completion to the application server etc.

The database mirroring device generates a differential log file on the basis of the data stored in the database or the data updated in the database, and hands over the differential log file to the standby node via the network. The data is thereby stored in the database on the side of the standby node in the same way as on the side of the operation node, or alternatively the data is updated in the database. Namely, the database mirroring device of the standby node updates the data in the database according to the differential log file transferred from the operation node.

The duplex monitor device monitors whether or not the database mirroring device normally executes a mirroring process via the network. If the mirroring process is not normally executed via the network, the duplex monitor device gets the database mirroring device and the present information management system to transition to an accumulation mode, and the differential log file is accumulated in a predetermined accumulating destination. Further, the duplex monitor device checks whether or not the mirroring process via the network is recovered and is again normally executed. Then, when the mirroring process via the network is recovered and is again normally executed, the duplex monitor device gets the database mirroring device and the information management system (the operation node and the standby node) to transition again to the synchronous transfer mode.

Note that each of the operation node and the standby node is constructed of a computer including a CPU, a memory, a hard disk drive, a drive for an attachable/detachable storage medium, a communication interface, etc. A configuration of this type of computer is broadly known, and hence its description is omitted.

Figure 2:
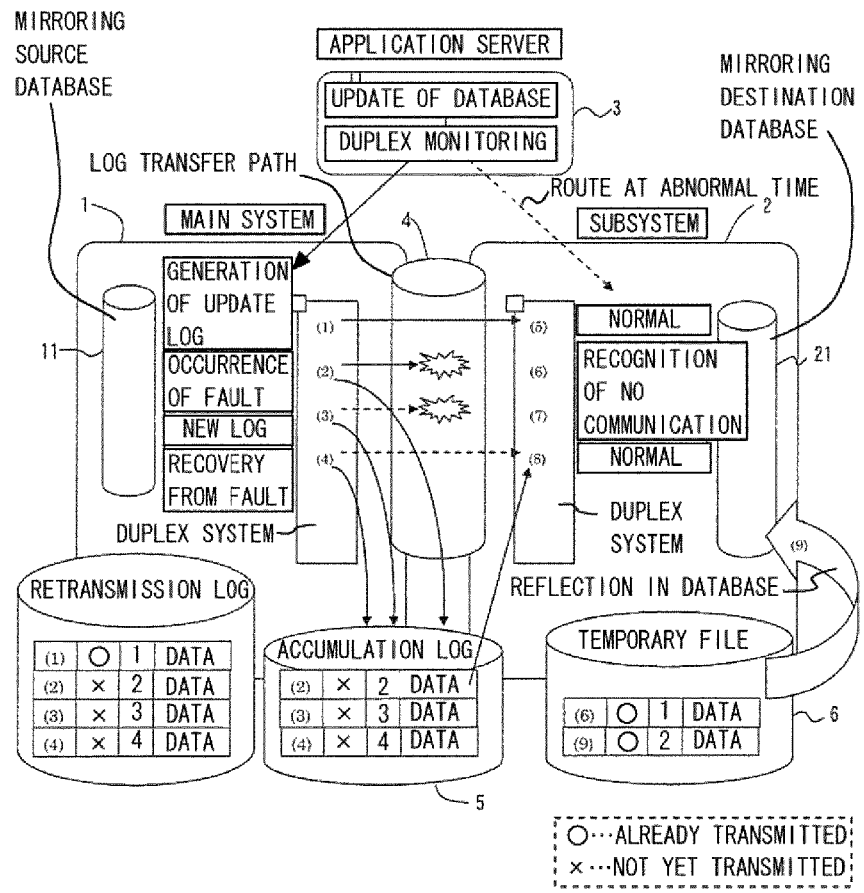
FIG. 2 is a view illustrating an outline of processes of the general type of information management system.

FIG. 2 illustrates an outline of the process of the general type of information management system. Hereinafter, in the present embodiment, the operation node is called a main system 1, while the standby node is called a subsystem 2.

Moreover, FIG. 2 depicts an application server 3. The application server 3 normally requests the main system 1 to update a database 11 (corresponding to a first storage unit). The main system 1 updates the database 11 in response to the request of the application server 3, and transfers log data representing the update of the database 11 to the subsystem 2. The subsystem 2 updates, based on the transferred log data, a database 12 (corresponding to a second storage unit). An update result that the main system 1 has updated the database 11 is thereby mirrored to the database 21 of the subsystem 2.

If a fault occurs on a log transfer path 4 with the result that the log data can not be transferred to the subsystem 2 from the main system 1, the main system 1 stops transferring the log data to the subsystem 2 in the synchronous transfer mode, and stores the log data as an accumulation log 5. The log data of the accumulation log 5 is transferred to the subsystem 2 at timing different from when the main system 1 updates the database. Therefore, an operation mode, in which the log data is accumulated as the accumulation log 5, is referred to as an accumulation mode.

In the information management system in FIG. 2, after the main system 1 has accumulated the log data, on the occasion of retransferring the log data by obviating the fault on the log transfer path 4, the operation conforms to a first-in first-out (FIFO) principle. Namely, the main system 1, in this case, transmits the not-yet-transmit data sequentially from the oldest data. Hence, it is unknown to the subsystem 2 monitoring the main system 1 and controlling switchover whether the main system 1 transitions to the accumulation mode due to the fault on the log transfer path 4 and whether the log that should be transferred originally to the subsystem 2 is in the accumulated status or any log is not generated with none of the update in the main system 1 itself. Further, in the log-accumulated status, when the operation node is switched over to the subsystem 2 from the main system 1, a possibility is that the data might be lost. Moreover, in this case, it is also unknown when the system is recovered to a complete synchronous transfer status.

The following is a description of a technique of transferring the log data of the accumulation log 5 in the information management system in FIG. 2. Processes (1) through (9) given below correspond to (1) through (9) attached to arrowheads in FIG. 2. Further, logs generated corresponding to these processes are also marked with the numerals (1) through (9).

(Operations of Main System)

(1) If the update log exists in the main system 1, the update log is transferred as the data to the subsystem 2. Normally, a response to an event that the update log is properly received, is transmitted back to the main system 1. Through this operation, the main system 1 recognizes that the synchronous transfer has been done, and can send the response back to the application server 3 with respect to, e.g., the commit operation.

(2) If the network fault occurs, information about the fault is acquired from monitoring a status by polling etc. or from a failure in the data transfer. As a result, the log data can not be transferred via the log transfer path 4, and the data is accumulated in the accumulation log 5. The failure in the data transfer is detected from no return of, e.g., reception acknowledgment about the data transferred via the log transfer path 4.

(3) A network status is monitored (it is monitored whether normally operable or not) by polling.

(4) If the recovery can be confirmed by monitoring the network status, the data of the accumulation log 5 is transferred based on the FIFO principle. As a result, new data, which is generated thereafter, is still accumulated in the accumulation log 5.

(Operations of Subsystem)

(5) The data is normally stored in a temporary file 6.

(6) Abnormality of the main system 1 is recognized from a result of monitoring the status by polling etc.

(7) In this case, such a state arises that it is unknown whether the database is in the complete synchronous status or not.

(8) The main system 1 transmits the data given the numbers in ascending sequence on the FIFO basis, and hence the received data is accumulated in the temporary file 6.

(9) In the case of enabling reflection in the database (i.e., when receiving a commit log), pieces of log data arranged in the predetermined sequence are assembled and reflected in the database.

In the information management system, the following problems arise.

(Problem A) The head data of the accumulation log 5 is transferred to the subsystem 2 on the FIFO basis in the operation (4), and it is therefore impossible for the subsystem 2 to decide at the point of time of (8) whether or not the log data is accumulated in the accumulation log 5. Further, it can be determined how much the log data has been accumulated in the accumulation log 5 at the present. Accordingly, if a further fault occurs in the main system 1 in the status where the fault has existed on the data transfer path 4 and when there arises a necessity for switching over the operation node from the main system 1 to the subsystem 2, it can not be determined what extent the data lost due to the switchover might cause a risk.

(Problem B) The subsystem 2 can recognize at the point of time of (8) that the data transfer path has been recovered, however, a data quantity of the accumulation log 5 is unknown. It is therefore unfeasible to estimate a data quantity of the lost data and a period of time till reaching the complete synchronous status. The user needs to examine a content of the accumulation log 5 in the main system 1.

Such being the case, the information management system provides, if the fault occurs on the data transfer path 4 in the duplexing process of the databases 11, 21, the function of enabling the subsystem 2 to recognize, to the earliest possible degree, the information necessary for managing and operating the databases 11, 21 such as the information about whether there is the risk in the lost data or not and the time till reaching the complete synchronous status on the occasion of managing the log data temporarily accumulated in the main system 1. This function enables the user to determine based on the information acquired from the subsystem 2 at an early stage whether the operation node can be switched over to the subsystem 2 or not.

The discussion on the embodiment is, however, made on the premise that the system is operated with the synchronous transfer for the commit of the database in order to avoid the data from being lost. The communications between the main system 1 and the subsystem 2 are generally given as follows.

(A) Management information is transmitted and received for the acknowledgement of the connection with the network and the acknowledgement of the status of the communication-partner server. This communication is defined as polling conducted at intervals of a fixed period of time.

(B) The generated log data is transferred to the subsystem 2 from the main system 1, and a result of this transfer is acquired. This communication is performed at a point of time when the data is generated and is therefore unperiodical. Moreover, this communication is conducted only in such a case that the communication is established based on the communication (A). Further, in the embodiment, the communications (A) and (B) are respectively established by different communication units for the following reason.

The communications (A) and (B) are different in terms of a trigger of the communication and traffic (communication quantity) thereof. Further, a third party server (monitor server) may be provided other than the main system 1 and the subsystem 2, depending on the mode of the information management system, and the third party server might perform the communication (A).

Figure 3:
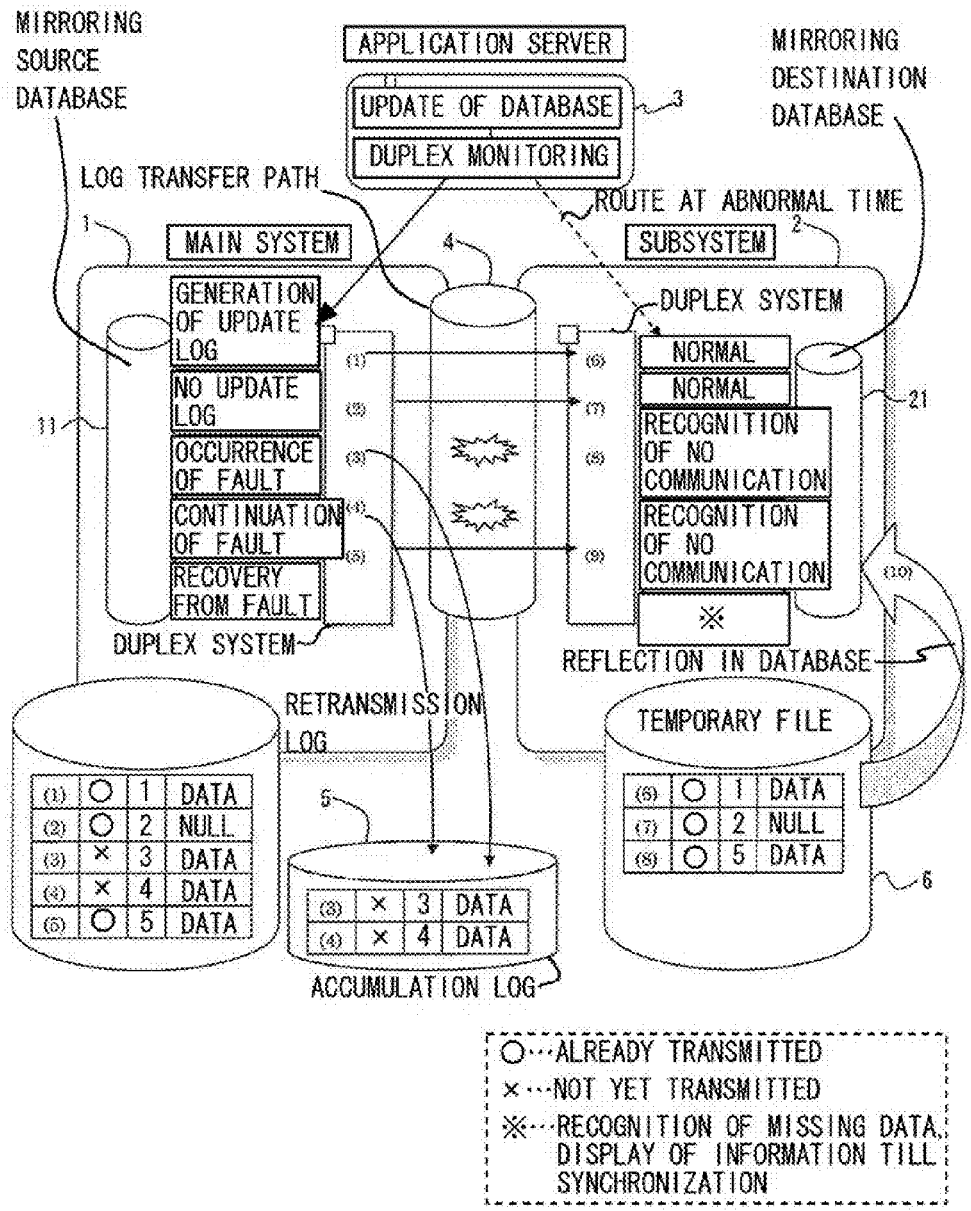
FIG. 3 is a view illustrating an outline of processes of the information management system.

FIG. 3 illustrates an outline of the processes of the information management system. The operation thereof will hereinafter be discussed in separation into the main system 1 and the subsystem 2.

(Operation of Main System)

(1) If the update log exists in the main system 1, the update log is transferred to the subsystem 2 via the log transfer path 4.

(2) If the update log does not exist, NULL data continues to be transferred at the intervals of the fixed period of time via the log transfer path 4. This transfer aims at monitoring some type of status. With this transfer, it is feasible to check soundness of the log transfer path 4 or check the status of the subsystem 2.

(3) If the network fault occurs due to the failure in the transfer (1) or the monitoring of the status (2), the data is accumulated in the accumulation log 5 on the side of the main system 1. Through this operation, the system transitions to the accumulation status, i.e., the accumulation mode.

(4) The main system 1 tries to, when polling next time and when the update log occurs, transfer the log data based on the latest log data to the subsystem 2. To be specific, the main system 1 tries to transfer the log data via the log transfer path 4 based on the latest log data and is thereby enabled to execute checking the recovery of the log transfer path 4 or checking the status of the subsystem 2. Note that the update log frequently occurs, the main system 1 transmits the update log to the subsystem 2 at the intervals of the fixed period of time. While on the other hand, if the update log does not occur even after an elapse of the predetermined period of time, the main system 1 transmits the NULL data to the subsystem 2.

(5) If the transfer of the latest log data gets successful, the data is hereafter transferred sequentially from the log data of the accumulation log 5. In the information management system according to the embodiment, however, after transitioning to the accumulation mode, a sequential number of the already-received latest log data is transmitted as the acknowledgement of the reception back to the main system 1 from the subsystem 2. Accordingly, the main system 1 specifies, based on the latest log data transmitted back, the log data of the accumulation log 5, which should be given the top priority. At this time, the priority levels for the transmission are set as below. Specifically, the first priority is given to the log with the retransmission requested, the second priority is given to the log existing in the accumulation log 5, and the third priority is given to the new update log.

Moreover, in the information management system, after transitioning to the accumulation log 5 such as this, if the transfer of the latest log data gets successful, the subsystem 2 transmits the retransmission request of the log data of the accumulation log 5 together with the acknowledgement of the reception. Accordingly, an available scheme is that the log data (the whole log data, or the latest log data or the log data having the specified sequential number) can be specified in this type of retransmission request.

(Operation of Subsystem)

(6) The subsystem 2 normally receives the log data properly via the log transfer path 4 and stores the log data in the temporary file.

(7) The abnormality of the main system 1 is recognized from the result of monitoring the status by polling etc.

(8) The abnormality of the main system 1 or the network is recognized from an event that the status-monitoring (message) is not reached.

(9) Missing data can be confirmed by receiving the data with the missing sequential number. Such being the case, the subsystem 2 makes the request for retransmitting the data coincident with the missing sequential number. As depicted in FIG. 4, the data size is determined, and hence the data quantity can be calculated because of being capable of grasping the missing pieces of data from the sequential numbers, which is reported to the user by way of an information message. The reported items can include the data quantity and a predicted period of time.

(10) If the missing log data is retransmitted and can be reflected in the database 21 (when receiving the commit log), the subsystem 2 reassembles a request for the update into a reorganized database from the received log data, and makes the reflection in the database 12.

<Data Structure>

A data structure of the data processed by the information management system will hereinafter be described with reference to FIGS. 4 through 7. A storage medium stored with these items of data can be exemplified by a file etc. on the hard disk according to the embodiment. In this case, the storage medium can be classified as a nonvolatile storage medium.

FIG. 4 illustrates typical elements of the update log dealt with by the information management system. The update log contains transmission information, the sequential number and the data. Among these items of information, the transmission information is information representing whether the transmission to the subsystem 2 is successful or not. The transmission information is registered with [already transmitted] representing a transmission complete status or [not yet transmitted] representing a not-yet-transmitted status.

The sequential number is a unique number in the ascending sequence, which is allocated when the update data is generated. The data represents the log data itself if the update log exists but the NULL data if the update log does not exist.

FIG. 5 illustrates a data structure stored in the main system 1. All of the generated update logs are stored in the main system 1. As described above, the transmission information is the information about whether the transmission to the subsystem 2 gets successful or not. In the main system 1, the already-transmitted update log may also be saved in preparation against an unexpected situation. The already-transmitted update log is, however, erasable.

In the information management system, if the update log can not be transferred to the subsystem 2 and if the subsystem 2 can not receive the update log, the subsystem 2 makes the request for the retransmission in a way that designates, e.g., the sequential number or gives a designation to transfer the latest update log or designates all of the not-yet-transmitted update logs. Therefore, the main system 1 is stored with the update logs in such a state that the update log can be retrieved based on the sequential number.

Such being the case, the main system 1 has the transmitted update log, the should-be-transmitted update log and the management information for managing the update log. The management information of the main system 1 contains a minimum not-yet-transmitted number and a maximum not-yet-transmitted number. An example in FIG. 5 illustrates that after transmitting the data having the sequential number "1" and the NULL data having the sequential number "2" the transmission of the data having the sequential numbers"3", "4" gets into a failure, and the data having the sequential number "5" can be transmitted. In this case, the management information of the main system 1 is that the minimum not-yet-transmitted number=3, and the maximum not-yet-transmitted number=4. Namely, the management information sets, as a point, the not-yet-transmitted number that is to receive the retransmission request from the subsystem 2. This scheme improves search efficiency in the case of receiving the retransmission request. Note that the nonvolatile storage medium is stored with the management information of the main system 1, which is, e.g., the minimum not-yet-transmitted number and the maximum not-yet-transmitted number. Moreover, in the embodiment, the already-transmitted update log is stored in the nonvolatile storage medium in the subsystem 2 on the receiving side, and can be therefore erased on the side of the main system 1.

FIG. 6 illustrates a data structure retained by the subsystem 2. The subsystem 2 has the received update log and the management information for managing the update log. The management information of the subsystem 2 contains a minimum not-yet-reflected number. Namely, the management information places a point on a next number of the already-reflected information. Note that the management information of the subsystem 2, which is namely the minimum not-yet-reflected number, is stored in the nonvolatile storage medium. An example in FIG. 6 is that the subsystem 2, after receiving the data having the sequential number "1" and the NULL data having the sequential number "2" receives the data having the sequential number "5". In this case, it follows that when the minimum not-yet-reflected number=3, the subsystem 2 receives the data having the sequential number "5".

The data structure such as this enables, when the subsystem 2 receives the data, the missing of the update log to be determined from the sequential number. If there is the missing update log, the main system 1 is requested to retransmit the number thereof. Further, it is possible to grasp how many pieces of data are missed, and hence the data quantity can be estimated. A reason why so is that in the information management system, the data size is determined based on the data structure depicted in FIG. 4. Incidentally, the already-reflected update log is erasable.

FIG. 7 depicts a data structure of the log data stored in the accumulation log 5 when transferred asynchronously. The log data accumulated in the accumulation log 5 in the main system 1 is the data that fails to be transferred to the subsystem 2 and does not yet, it is assured, exist in the temporary file 6 of the subsystem 2. Hence, after recovering the transfer path, this log data is the data that should be preferentially transferred, and such implementation may be done that the log data is transferred batchwise. In response to the request of the subsystem 2, however, the specified log data in the accumulation log 5 may also be preferentially transmitted.

<Example of Information Message of which User is Notified>

The information management system notifies the user of, e.g., an information message described as below. To begin with, an example of the information message that is output to the main system 1 if the abnormality is detected from determining the result of the data transfer and when transitioning to the accumulation status, is given as follows: [The data is accumulated in the main system 1 because of a failure in the data transfer.] Another example of the information message that is output in the case of detecting the missing by checking the sequential number in the subsystem 2, is given as follows: [The data is in the process of being retransmitted. The synchronization of the data needs transferring xx-bytes for yy-sec.]

Note that in this type of display, an average value etc. is calculated from statistic information obtained so far, and an estimation value may be displayed as the time required for the recovery. Moreover, the estimation value may be calculated from, e.g., the average time required for recovering the log transfer path 4 and the transfer time required for transferring the accumulated log information.

FIRST WORKING EXAMPLE

Figure 8:
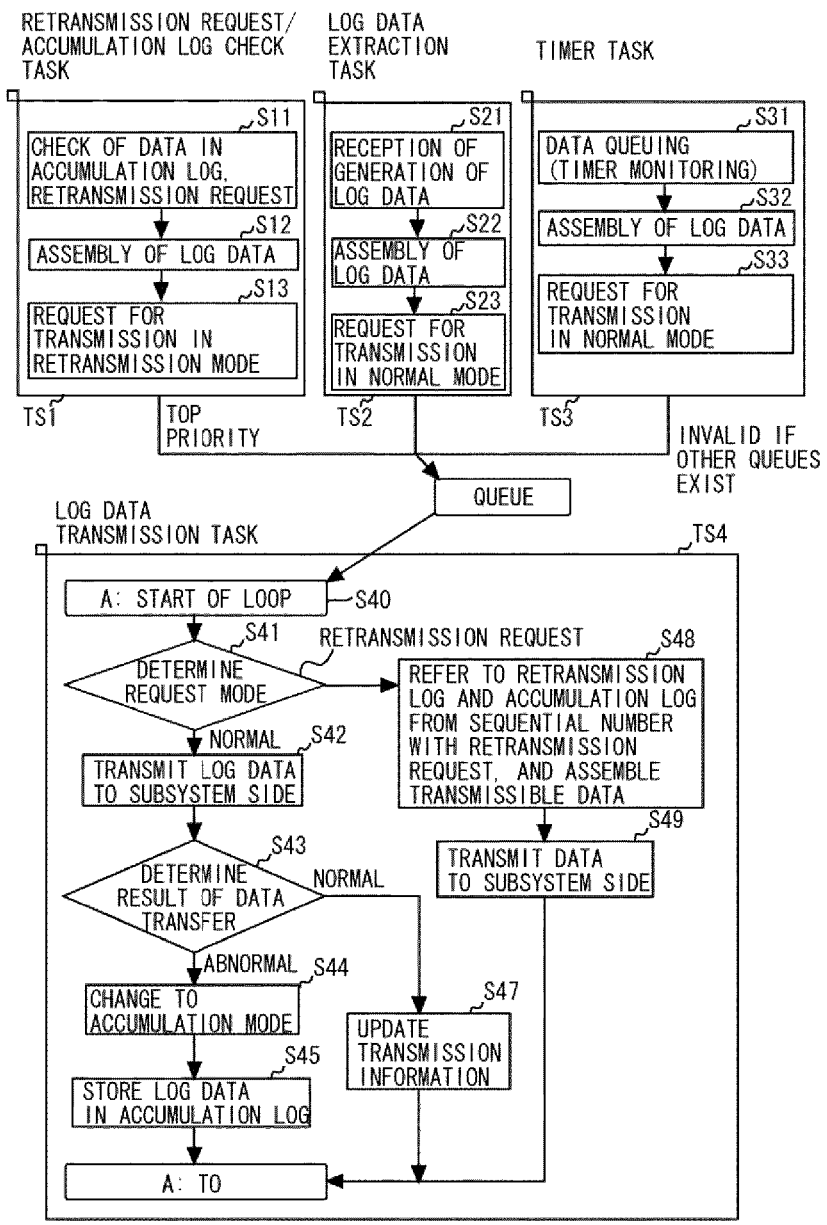
FIG. 8 is a flowchart illustrating a processing flow of the main system.

FIG. 8 illustrates a processing flow of the main system 1. The CPU of the computer configuring the main system 1 executes a computer program, thereby realizing this processing flow. Incidentally, a premise of the processing flow in FIG. 8 in the information management system is that the main system 1 and the subsystem 2 operate in the synchronous mode.

Moreover, this process is processed in a way that divides the process into a plurality of tasks. As in FIG. 8, the task of the main system 1 includes a retransmission request/accumulation log check task TS1, a log data extraction task TS2, a timer task TS3 and a log data transmission task TS4.

Among these tasks, the retransmission request/accumulation log check task TS1 is a task executed in response to the retransmission request from the subsystem 2. In this task, the main system 1 accepts a request for checking the data in the accumulation log 5 and the retransmission request from the subsystem 2 (S11). These requests are transmitted to the main system 1 from the subsystem 2 via the log transfer path 4. In the system where the third party server (monitor server) exists, however, the check of the data in the accumulation log 5 and the retransmission request may be handed over to the main system 1 via the third party server (monitor server).

Then, the main system 1 assembles the log data requested for the transmission from the data within the accumulation log 5 (S12). As already explained in FIG. 6, the main system 1 retains the minimum not-yet-transmitted number and the maximum not-yet-transmitted number as the management information. In the embodiment, the subsystem 2 makes the request for the retransmission in a way that designates the sequential number or designates all the not-yet-transmitted log data or designates the latest log data. The main system 1 places a point on a range specified (defined) by the minimum not-yet-transmitted number and the maximum not-yet-transmitted number, and may therefore simply retransmit the proper log data in response to the retransmission request from the subsystem 2. For example, all of the logs may be transmitted batchwise. Further, the main system 1 may also select and transmit the log data having the designated sequential number.

Then, the main system 1 registers the transmission request in a queue in the retransmission mode (S13).

The log data extraction task TS2 is a task for reflecting, in the subsystem 2, the log data generated accompanying the operation that the main system 1 updates the database, and so on. In this task TS2, the main system 1 receives the information representing the generation of the log data (S21). Then, the main system 1 assembles the log data that should be sent to the subsystem 2. To be specific, the main system 1 assembles the log data in the mode of reading the log data output by the database management system and handing over the log data to the log data transmission task TS4 when making the transmission request. Then, the main system 1 registers the transmission request in the queue in the normal mode (S23). The normal mode connotes that the mode is not the retransmission mode.

The timer task TS3 is a task for transmitting the null (NULL) log data according to the timer monitor. If the log does not occur for the predetermined period of time or longer, it follows that the data is not exchanged between the main system 1 and the subsystem 2 during this period. Such being the case, if none of the log occurs for the predetermined period of time, the null (NULL) log data is transmitted based on the timer monitor, thus checking the communications between the main system 1 and the subsystem 2.

In this task TS3, the main system 1 executes a queuing process of adjusting the data transmission timing based on the timer monitor (S31). Then, the main system 1 assembles, based on the null (NULL) data, the log data that is transmitted to the subsystem 2 (S32). Subsequently, the main system 1 registers the transmission request in the queue in the normal mode (S33).

The retransmission request/accumulation log check task TS1, the log data extraction task TS2 and the timer task TS3 generate the transmission request to the log data transmission task TS4. The transmission request based on the retransmission request/accumulation log check task TS1 is, however, processed by the log data transmission task TS4 with the top priority. On the other hand, the transmission request of the timer task TS3 has the lowest priority and is invalidated if the transmission request is given to the queue from another task. In this case, the transmission request of the timer task TS3 is deleted from the queue.

The log data transmission task TS4 extracts the transmission request according to the priority from the queue, and repeatedly executes the transmission process. Now, an assumption is that the control status is in a start position of a loop (S40). At the head of the loop, the main system 1 extracts the transmission request from the queue. If the queue is null, however, the main system 1 (the log data transmission task TS4) comes to the queuing status.

When extracting one transmission request from the queue, the main system 1 determines a request mode of this transmission request (S41). If the transmission request is in the normal mode, the main system 1 transmits the transmission-requested log data (S42). The CPU of the main system 1, which executes this process, corresponds to a notifying unit. Then, the main system 1 determines a result of the data transfer (S43). Subsequently, if the data transfer is normally finished, the main system 1 updates the transmission information (S47). Namely, the main system 1 changes the transmission information specified by the sequential number associated with the transmitted log data to [already transmitted]. Thereafter, the main system 1 loops back the control to the start of the loop (S40).

On the other hand, if the determination in S43 proves that the data transfer is not normally finished, the main system 1 transitions to the accumulation mode (S44). In the accumulation mode, the main system 1 stores the log data in the accumulation log 5 (S45). The CPU of the main system 1, which executes this process, corresponds to an accumulating unit. Thereafter, the main system 1 loops back the control to the start of the loop (S40).

Moreover, if the request mode is the retransmission request in the determination in S41, the main system 1 refers to the accumulation log 5 and assembles the transmissible data from the sequential number allocated to the retransmission request (S48). In this case, the should-be-transmitted data is assembled based on the log data having the designated sequential number or all the log data in the accumulation log 5 or the latest log data in response to the retransmission request given from the subsystem 2. Then, the main system 1 transmits the thus-assembled data to the subsystem 2 (S49). The CPU of the main system 1, which executes this process, corresponds to a re-notifying unit. Thereafter, the main system 1 loops back the control to the start of the loop (S40).

Figure 9:
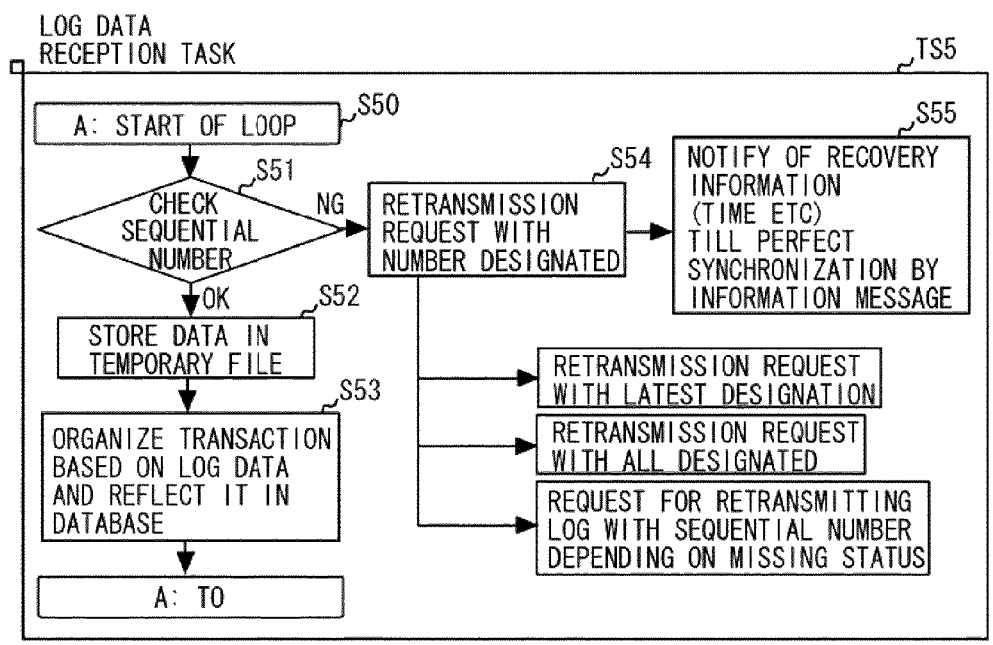
FIG. 9 is a flowchart illustrating a processing flow of a log data reception task executed by the subsystem.

FIG. 9 illustrates a processing flow of a log data reception task TS5 executed by the subsystem 2. The log data reception task TS5 is normally in the loop start position in a status of waiting for receiving the log data (S50). At the head of the loop, the subsystem 2 extracts the received log data. Then, the subsystem 2 checks the sequential number of the received log data (S51).

If the sequential number of the received log data does not correspond to the missing number in the sequential numbers of already-received pieces of log data, the subsystem 2 determines this log data to be "OK". Then, in the case of "OK", the subsystem 2 stores the data in the temporary file 6 (S52). Subsequently, the subsystem 2 organizes a transaction as the result of the update in the main system 1 on the basis of the log data from the received data. Then, the subsystem 2 reflects the organized transaction in the database 21 (S53). Thereafter, the subsystem 2 loops back the control to S50.

On the other hand, if the sequential number of the received log data corresponds to the missing number in the sequential numbers of already-received pieces of log data, the subsystem 2 determines this log data to be "NG". The CPU of the subsystem 2, which executes this process, corresponds to a unit detecting the missing of reception. Then, in the case of "NG" the subsystem 2 transmits the retransmission request to the main system 1 so as to retransmit the log having the missing sequential number (S54). The CPU of the subsystem 2, which executes this process, corresponds to a unit making a request for retransmission. The way of making the retransmission request in this case is exemplified such as the retransmission request with the sequential number designated, the retransmission request with the latest not-yet-transmitted log designated and the retransmission request with all of the logs designated. It may be determined beforehand in the system setting about which retransmission request is executed.

Next, the subsystem 2 notifies the user (or the application server 3) of the information on the recovery such as the time till the complete synchronization is recovered in the form of the information message (S55). The CPU of the subsystem 2, which executes this process, corresponds to a notifying unit.

Note that once the process in S54 is executed, the subsystem 2 recognizes that the information management system comes to the accumulation mode, and repeats the processes in S54 and S55 at the intervals of the fixed period of time till the operation is restored to the synchronous mode.

In the embodiment, it is sufficient that the log transfer path 4 establishes a dedicated connection between the main system 1 and the subsystem 2. Therefore, the main system 1 and the subsystem 2 are connected to each other via a dedicated line, a dedicated LAN, Fibre Channel, etc., which are different from the general-purpose service networks. Moreover, in a system where the main system 1 and the subsystem 2 are installed in positions vicinal to each other, the connection between the main system 1 and the subsystem 2 may be established by a bus, hardware configuring a cluster of computers, etc. Note that the status monitor, which is, e.g., the polling communications between the main system 1 and the subsystem 2, may be configured through the dedicated communications described above. The status monitor may also be, however, configured through the general-purpose communications.

<Effects>

According to the information system, just when obviating the fault on the log transfer path 4, it is feasible to determine whether there is any missing data in the log data or not, and hence a quantity of the lost data in the case of being switched over can be analyzed. The data quantity with the missing log can be estimated at a point of time when recovered from the fault, thereby enabling the period of time till reaching the complete synchronous status to be grasped and enabling the user to determine how the risk is.

Moreover, the update log serving also as the status check with the latest data is always transferred. Namely, the latest log data is enabled to continue to be transmitted to the subsystem 2. If there is a large quantity of log data when the fault occurs, a load on the network is reduced while the accuracy rises because of a substitute for transmitting and receiving the management information.

If succeeding in the transmission, the subsystem 2 compares the sequential number of the data received just prior thereto with the sequential number of the data received finally. Then, the information management system executes the process of estimating the missing data quantity and the recovery time. Therefore, the user is enabled to determine the information described above at the early stage. The missing data count can be known from the sequential numbers attached to pieces of transmission data, with the result that an accurate quantity of the retransmission data can be grasped. Prediction up to the resumption can be presented based on this quantity of retransmission data, which becomes an importance piece of information used for the user to determine the operation based on the recovery time to the duplexed status. For example, this is exemplified such as the determination made in the middle of the recovery about whether the operation node is switched over to the subsystem 2 from the main system 1.

SECOND WORKING EXAMPLE

The first working example has discussed the information management system in which the main system 1 transmits the log data to the subsystem 2, and the main system 1 and the subsystem 2 synchronize with each other. Then, if the abnormality occurs on the log transfer path 4 and when the main system 1 is disabled from transmitting the log data to the subsystem 2, the main system 1 and the subsystem 2 come to the accumulation mode, and the subsystem 2 sends the request for retransmitting the log data to the main system 1.

A second working example will further discuss the information management system in which if the operation time in the accumulation mode is elongated and if the log data stored in the accumulation log 5 increases, the log data is transferred to the subsystem 2 from the main system 1 via the application server 3 in place of the log transfer path 4. Other configurations and operations are the same as those in the first working example. Such being the case, the same components are marked with the same reference numerals and symbols as those in the first working example, and their explanations are omitted.

In second working example, in addition to the tasks in the first working example, an AP (application) server communication task TS6 is executed. The AP server communication task TS6 is a task for transferring, if a predetermined period of time elapses in the accumulation mode status, the log data in the accumulation log 5 to the subsystem 2 from the main system 1 via the application server 3. The AP server communication task TS6 is not required to operate always with the occurrence of the log data and may therefore be included in the timer task TS3.

The application server 3 operates in a way that links up with the information management system, and executes a variety of service applications. The application server 3 is connected to the main system 1 or the subsystem 2 via, e.g., a backbone network or a normal service network (which will hereinafter simply be referred to as a service network). The service network between the application server 3 and the main system 1 or the subsystem 2 is operated normally by use of a network medium different from the network configuring the log transfer path 4.

In the present embodiment also, in the same way as in the first working example, the log transfer path 4 may establish the dedicated connection between the main system 1 and the subsystem 2.

On the other hand, as described above, the information management system (including the main system 1 and the subsystem 2) and the application server 3 are connected via the general-purpose service LAN. Accordingly, even if the communication via the log transfer path 4 is under an unacceptable condition, there is a high possibility that the service network can be utilized. Further, if the service network is communication-disabled, the whole service system including the application server 3 gets into malfunction. It therefore normally does not happen that the service network gets the communication-disabled.

Hence, even when the main system 1 and the subsystem 2 transition to the accumulation mode due to the unacceptable condition of the log transfer path 4, there can sufficiently occur a status in which the communication of the service network functions. In such a status, the log data in the accumulation log 5 can be reflected in the subsystem 2 at the early stage by transferring the management information to the subsystem 2 from the main system 1. Moreover, even if the communication via the log transfer path 4 is under the unacceptable condition, the subsystem 2 can receive the notification that the main system 1 is in the normal operation in the accumulation mode.

Figure 10:
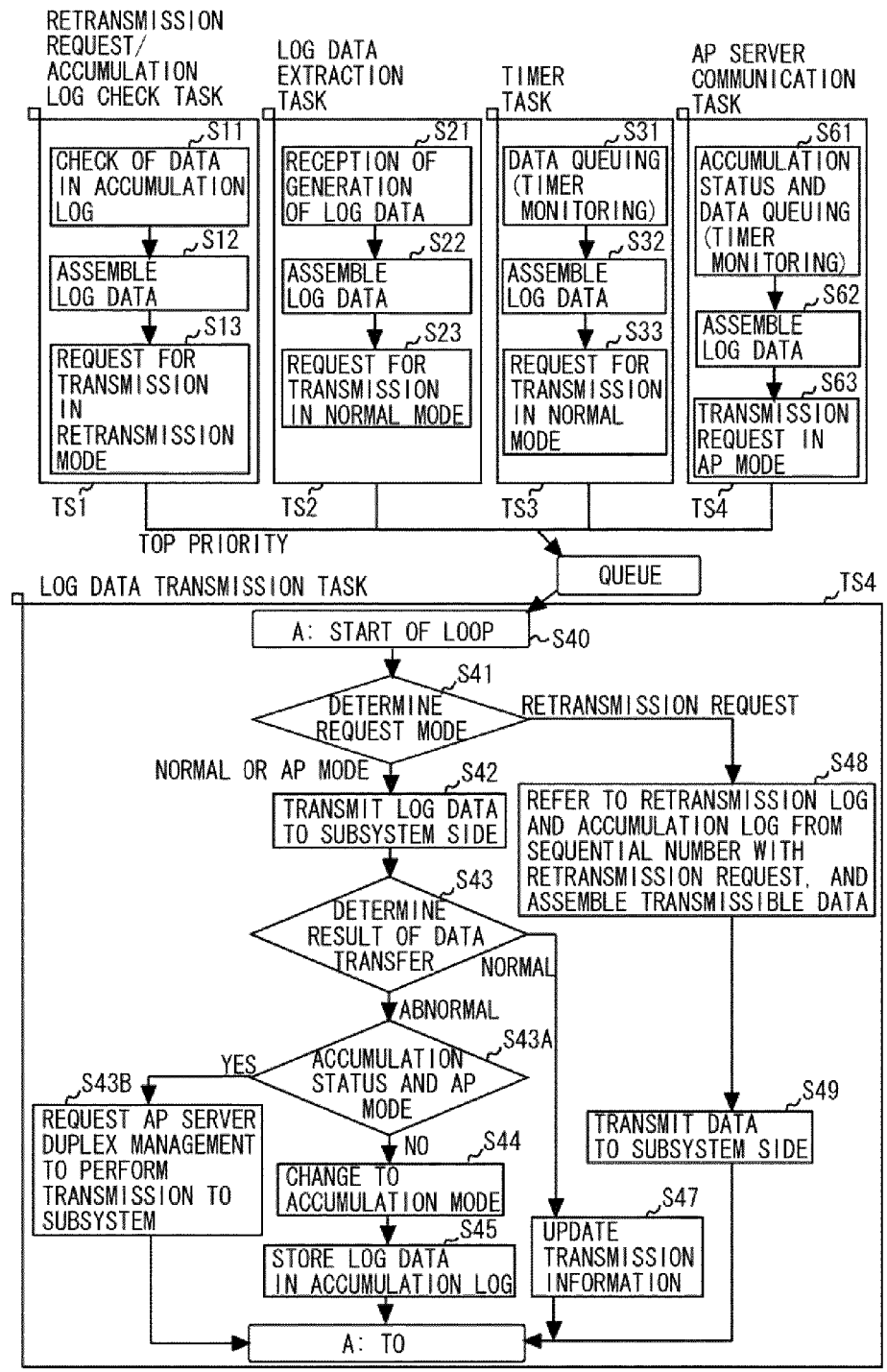
FIG. 10 is a flowchart illustrating a processing flow including an AP server communication task.

FIG. 10 illustrates a processing flow including the AP server communication task TS6. In this processing flow, the same processes as those in FIG. 8 are marked with the same reference numerals and symbols, and their explanations are omitted. In this processing flow, as a result of the data transfer, when determining that the data transfer is not normally finished (an abnormal state in S43), the main system 1 is already in the accumulation mode (i.e., the mode for storing the log data in the accumulation log 5, which is also called an accumulation status) at the present, and determines whether in a transfer execution mode based on the AP server communication task TS6 or not (S43). If affirmative in the determination in S43A, the main system 1 makes the request for transferring the log data in the accumulation log 5 to the subsystem 2 with respect to the duplex management of the application server 3 (S43B). In the duplex management of the application server 3, the transfer request is registered in the queue that is processed by the AP server communication task TS6. Thereafter, the main system 1 loops back the control to S40. Note that if negative in the determination in S43A, in the same way as in the first embodiment, the processes from S44 onward are executed.

On the other hand, in the AP server communication task TS6, the main system 1 performs the timer-monitoring in the accumulation mode (S61). Then, after an elapse of the predetermined period of time measured by the timer, the main system 1 assembles the communication data (which is also termed a packet) for transmitting the log data based on the accumulation log 5 in response to the transmission request (S62). Then, the log data is transferred to the subsystem 2 through the communication (which is called an AP mode) via the application server 3 (S63). To be specific, the log data is handed over to the communication task on the application server 3 in a way that designates the transfer to the subsystem 2. The communication task on the application server 3, upon receiving the transfer request from the main system 1, transfers the handed-over log data to the subsystem 2 defined as the designated transfer destination.

The log data transmission procedure in this case is the same as the case (S42 by the log data transmission task TS4) of transmitting the log data via the log transfer path 4 explained in FIG. 10. Namely, after becoming the accumulation mode, there is made a trial for transmitting the log data to the subsystem 2.

Then, when the AP server communication task TS6 once succeeds in transmitting the latest log data via the application server 3, the subsystem 2 can notify the user of the data quantity and the predicted time by way of the information message.

As described above, in the second working example, if the accumulation status continues for the predetermined period of time or longer, the log data in the accumulation log 5 is transferred to the subsystem 2 from the main system 1 through the communication via the application server 3. This contrivance facilitates, in the subsystem 2, the grasp of the operating status of the main system 1 at the early stage. Further, if the service network including the application server 3 comes to the unacceptable state in communications, the service application itself is disabled from operating, and hence the log data can be transferred to the subsystem 2 from the main system 1 to such a limit that the system gets operation-disabled by performing the transfer based on the AP server communication task TS6.

THIRD WORKING EXAMPLE

In the working examples 1 and 2, the log data received by the subsystem 2 is stored in the temporary file 6. In this case, the temporary file 6 is assumed to be the nonvolatile storage device such as the file of the hard disk, etc. The implementation of the present invention is not, however, necessarily limited to the configuration such as this.

In the third working example, the log data received by the subsystem 2 may be retained in a volatile temporary file 6 (e.g., a memory). In this case, a transmission log 4 is saved as a retransmission log on the side of the main system 1. The retransmission log may be deleted when receiving the log data from the subsystem 2 and receiving notification purporting that the update into the database 21 is completed.

In this case, for example, if the subsystem 2 falls into system-down before the subsystem 2 reflects a content of the temporary file 6 in the database 21, the log data in the temporary file 6 disappears without being reflected in the database 21. Accordingly, in this case, after the subsystem 2 has recovered to the normal status, the main system 1 may be requested to retransmit the log data from the retransmission log. For attaining this scheme, the subsystem 2 may store the nonvolatile memory with at least the sequential number already reflected in the database 21.

For example, this technology can solve problems as follows. It is, however, presumed that a further abnormal status occurs in the main system while accumulating the logs in the main system due to the abnormality in the network. In this case, such a request arises that switchover to the subsystem from the main system is, it is desired, made immediately. The logs are not, however, transferred to the subsystem, and hence the switchover can not be done in a perfectly synchronous status. Namely, the switchover to the subsystem from the main system involves a risk in losing the data.

Therefore, during the accumulation of the logs and when restored from the fault, the user is required to recognize the following information and to judge about the operation and the switchover. Generally, this judgment is made based on the information of an intact server (e.g., the subsystem etc.).

The information is about whether the logs are accumulated in the main system or not. Another piece of information is about whether the network and the duplexing process are restored or not if the logs are accumulated in the main system. Still another piece of information is about how much time is required for reaching a data perfect-synchronous status if restored. Yet another piece of information is, namely, about whether the risk in losing the data disappears or not. Thus, it is required of the duplex system to provide the precise information to the subsystem to the earliest possible degree.

The present technology disclosed herein aims at providing precise information to a subsystem from a main system to the earliest possible degree even when a duplex system exits a duplexing process due to a fault etc. in a network.

According to the present information management system, the active device notifies of the update record information in a way that attaches the sequential number to the update record information, and accumulates the update record information if unable to confirm the completion of the notification, made by the notifying unit, of the update record information via the communication path. With a repetition of these steps, the preliminary device can detect the missing reception of the update record information based on the regularity of the sequential numbers attached to the pieces of update record information. Accordingly, it is feasible to detect the information about matching data stored in the first storage unit of the active device with data stored in the second storage unit of the preliminary device.

More specifically, the notifying unit of the active device, when receiving none of the retransmission request from the preliminary device in a status where the update record information is accumulated in the accumulating unit, may notify of the update record information in a way that attaches a sequential number subsequent to the sequential number contained in the update record information accumulated in the accumulating unit to the update record information of the newly stored data. With this scheme, on the side of the preliminary device, it is known that if the missing sequential number is detected, the update record information associated with the missing sequential number is accumulated in the accumulating unit of the active device.

According to the information management system, it is feasible to provide the precise information to the subsystem from the main system to the earliest possible degree even when the duplex system exits the duplexing process due to the fault etc. in the network.

<<Readable-by-Computer Recording Medium>>
<<Readable-by-Computer Recording Medium>>

A program for making a computer, other machines and devices (which will hereinafter be referred to as the computer etc.) realize any one of the functions can be recorded on a recording medium readable by the computer etc. Then, the computer etc. is made to read and execute the program on this recording medium, whereby the function thereof can be provided.

Herein, the recording medium readable by the computer etc. connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a DAT, an 8 mm tape, a memory card, etc. are given as those removable from the computer.

Further, a hard disc, a ROM (Read-Only Memory), etc. are given as the recording mediums fixed within the computer etc.

<Example of Configuration of Computer>

Figure 11:
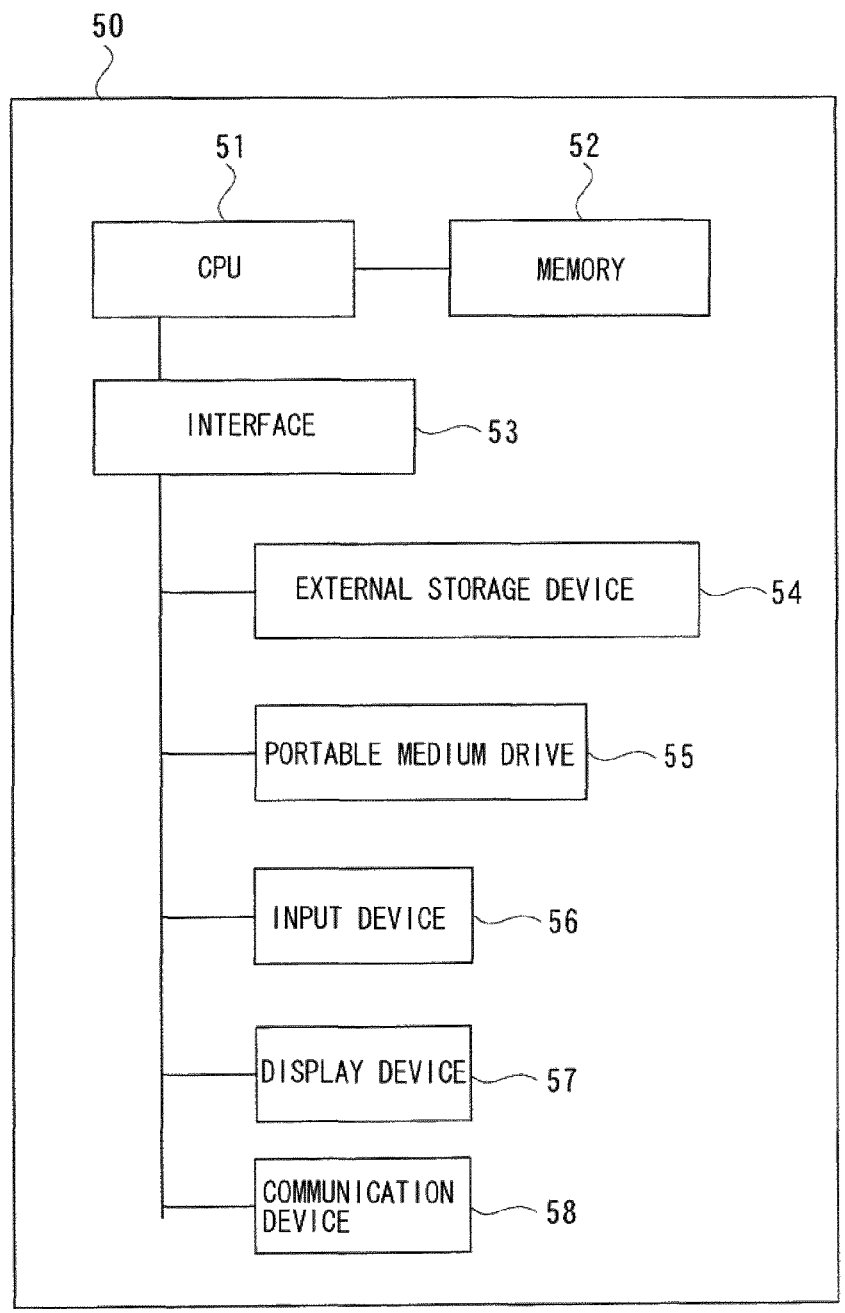
FIG. 11 is a diagram illustrating a configuration of a computer.

The operation node (which is also called the main node, the active node, the main system and the active device) and the standby node (which is also called the sub-node, the preliminary node, the subsystem and the preliminary device) can be exemplified as a system including, e.g., the computer. The application server can be also exemplified as a system including the computer. FIG. 11 illustrates a configuration of a computer 50 such as this. The computer 50 includes, e.g., a CPU (Central Processing Unit) 51, a memory 52, an interface 53, and a peripheral device connected to the interface 53. Further, the peripheral device includes an external storage device 54, a portable medium drive 55, an input device 56, a display device 57 and a communication device 58. The CPU 51 executes binary-formatted programs developed in an executable manner on the memory 52, thereby providing the functions as the operation node, the standby node, or the application server, etc. The CPU 51 may be a normal type of single-core processor and may also be a multi-core processor.

The memory 52 is stored with the program executed by the CPU 51, the data processed by the CPU 51, and so on. The CPU 51 and the memory 52 are connected to each other via, e.g., an internal bus. Note that the program described above is stored in a portable medium attached to the portable medium drive 55, or installed into the computer 50 from another computer connected to the communication device 58 and stored in the external storage device 54.

The interface 53 provides a connecting function between the CPU 51 and the peripheral device. Namely, the CPU 51 transfers and receives the data to and from the peripheral device via the interface 53. FIG. 11 illustrates the interface 53, however, the CPU 51 may be connected to the peripheral device via a plurality of interfaces. For example, the interface for a display device 57 can be exemplified by a DVI (Digital Visual Interface) and a VGA (Video Graphics Array). The external storage device 54, the portable medium drive 55 and the input device 56 can be exemplified by a serial interface such as a USB (Universal Serial Bus), Fibre Channel and a serial ATA (AT Attachment). Moreover, the interface for connecting the external storage device 54 to the CPU 51 may involve using a parallel interface such as an ATA, an IDE (Integrated Drive Electronics), an SCSI (Small Computer System Interface) and a PCI (Peripheral Components Interconnect). The external storage device 54 is exemplified by a hard disk drive and a storage device including a flash memory. Note that the external storage device 54 may also be a device including a RAID (Redundant Arrays of Inexpensive Disks) controller and a plurality of hard disks.

The portable medium drive 55 is exemplified by drives for a Blu-ray disc, a DVD (Digital Versatile Disc), a CD (Compact Disc) and a flash memory card.

The input device 56 includes, e.g., a keyboard, a pointing device, etc. The pointing device is exemplified by a mouse, a flat point, a touch panel, etc. The display device 57 is exemplified such as a liquid crystal display and an electroluminescence panel.

The communication device 58 is, for example, a LAN (Local Area Network) board, etc. Note that a communication-dedicated processor in addition to the CPU 51 may be provided for the duplex system discussed in the embodiment.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An information management system including an active device and a preliminary device that are connected to each other via a communication path, the active device comprising:
   a first storage unit stored with data;
   a notifying unit attaching, when the data is stored in the first storage unit, a sequential number representing a notification number to update record information for recording an event that the data is stored, and notifying the preliminary device of the update record information via the communication path;
   an accumulating unit accumulating the update record information if unable to confirm completion of the notification, by the notifying unit, of the update record information via the communication path; and
   a unit notifying again of, when receiving a retransmission request of the update record information from the preliminary device, the update record information accumulated in the accumulating unit through the notifying unit,
   the preliminary device comprising:
   a unit monitoring the update record information of which the active device notifies and detecting, based on regularity of the sequential numbers attached to the respective pieces of update record information, missing reception of the update record information;
   second storage unit stored with data;
   a unit updating the data in the second storage unit according to the update record information of which the active device notifies;
   a unit making a request for, when detecting the missing reception of the update record information, retransmitting the update record information; and
   a unit notifying of, based on the sequential number that should be attached to the update record information with the missing of the reception, information about matching data stored in the first storage unit of the active device with data stored in the second storage unit of the preliminary device;
   wherein the notifying unit of the active device, when the update record information is accumulated in the accumulating unit and when receiving none of the retransmission request from the preliminary device, notifies of the update record information in a way that attaches a sequential number subsequent to the sequential number contained in the update record information accumulated in the accumulating unit to the update record information of the data newly stored in the first storage unit.

2. The information management system according to claim 1, wherein the active device further comprises:
   a unit performing communications with a linkup device requesting the information management system to provide a service; and
   a unit requesting the linkup device to transfer the update record information accumulated in the accumulating unit to the preliminary device.

3. An information management method executed by an information management system including an active device and a preliminary device that are connected to each other via a communication path, the active device executing:
   storing data in a first storage unit;
   attaching, when the data is stored in the first storage unit, a sequential number representing a notification number to update record information for recording an event that the data is stored, and notifying the preliminary device of the update record information via the communication path;
   accumulating the update record information in an accumulating unit if unable to confirm completion of the notification, in the attaching, of the update record information via the communication path; and
   notifying again of, when receiving a retransmission request of the update record information from the preliminary device, the update record information accumulated in the accumulating unit,
   the preliminary device executing:
   monitoring the update record information of which the active device notifies and detecting, based on regularity of the sequential numbers attached to the respective pieces of update record information, missing reception of the update record information;
   storing data in a second storage unit;
   updating the data in the second storage unit according to the update record information of which the active device notifies;
   making a request for, when detecting the missing reception of the update record information, retransmitting the update record information; and
   notifying of, based on the sequential number that should be attached to the update record information with the missing of the reception, information about matching data stored in the first storage unit of the active device with data stored in the second storage unit of the preliminary device;
   wherein the notifying as executed by the active device includes, when the update record information is accumulated in the accumulating unit and when receiving none of the retransmission request from the preliminary device, notifying of the update record information in a way that attaches a sequential number subsequent to the sequential number contained in the update record information accumulated in the accumulating unit to the update record information of the data newly stored in the first storage unit.

4. A non-transitory recording medium recorded with a computer program for making an active device and a preliminary device that are connected to each other via a communication path function as an information management system, the computer program comprising:

a program for making the active device execute:

storing data in a first storage unit;

attaching, when the data is stored in the first storage unit, a sequential number representing a notification number to update record information for recording an event that the data is stored, and notifying the preliminary device of the update record information via the communication path;

accumulating the update record information in an accumulating unit if unable to confirm completion of the notification, in the attaching, of the update record information via the communication path; and notifying again of, when receiving a retransmission request of the update record information from the preliminary device, the update record information accumulated in the accumulating unit; and a program for making the preliminary device execute:

monitoring the update record information of which the active device notifies and detecting, based on regularity of the sequential numbers attached to the respective pieces of update record information, missing reception of the update record information;

storing data in second storage unit;

updating the data in the second storage unit according to the update record information of which the active device notifies;

making a request for, when detecting the missing reception of the update record information, retransmitting the update record information; and notifying of, based on the sequential number that should be attached to the update record information with the missing of the reception, information about matching data stored in the first storage unit of the active device with data stored in the second storage unit of the preliminary device;

wherein the notifying as executed by the program for making the active device includes, when the update record information is accumulated in the accumulating unit and when receiving none of the retransmission request from the preliminary device, notifying of the update record information in a way that attaches a sequential number subsequent to the sequential number contained in the update record information accumulated in the accumulating unit to the update record information of the data newly stored in the first storage unit.

* * * * *